(12) United States Patent
Ito (10) Patent No.: US 11,159,726 B2
(45) Date of Patent: Oct. 26, 2021

(54) LENS APPARATUS, CAMERA, CONTROL METHOD, AND STORAGE MEDIUM

(71) Applicant: CANON KABUSHIKI KAISHA, Tokyo (JP)

(72) Inventor: Rumi Ito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 16/295,382

(22) Filed: Mar. 7, 2019

(65) Prior Publication Data

US 2019/0289216 A1 Sep. 19, 2019

(30) Foreign Application Priority Data

Mar. 14, 2018 (JP) .............................. JP2018-046566
Feb. 21, 2019 (JP) .............................. JP2019-029042

(51) Int. Cl.
*H04N 5/232* (2006.01)
*G02B 27/64* (2006.01)
(Continued)

(52) U.S. Cl.
CPC ....... *H04N 5/23287* (2013.01); *G02B 27/646* (2013.01); *G03B 5/00* (2013.01);
(Continued)

(58) Field of Classification Search
CPC .. H04N 5/23287; H04N 5/00; H04N 5/23209; H04N 5/23258; H04N 5/2251;
(Continued)

(56) References Cited

U.S. PATENT DOCUMENTS 9,876,958 B2   1/2018 Sakurai et al.
2015/0301353 A1  10/2015 Takeuchi
(Continued)

FOREIGN PATENT DOCUMENTS

CN   103763468 A   4/2014
CN   10421436 A    12/2014
(Continued)

OTHER PUBLICATIONS

Office Action issued in Chinese Appln. No. 201910193595.X dated Dec. 29, 2020. English translation provided.
(Continued)

*Primary Examiner* — Mekonnen D Dagnew
(74) *Attorney, Agent, or Firm* — Rossi, Kimms & McDowell LLP (57) ABSTRACT

A lens apparatus detachable from a camera that includes a first correction unit movable for an image stabilization in a camera system including the lens apparatus and the camera. The lens apparatus includes a second correction unit movable for the image stabilization, and a setting unit. The camera system moves one correction unit of the first correction unit and the second correction unit and does not move the other correction unit in the image stabilization before imaging for recording starts, and moves the first correction unit and the second correction unit in the image stabilization during the imaging for recording, and the setting unit sets information on a correction ratio between the first correction unit and the second correction unit for
(Continued)

each direction of the one correction unit from a position of the one correction unit when the imaging for recording starts.

12 Claims, 5 Drawing Sheets (51) Int. Cl.
G03B 5/00 (2021.01)
G03B 17/12 (2021.01)
G03B 13/22 (2021.01)
H04N 5/00 (2011.01)
G03B 17/14 (2021.01)

(52) U.S. Cl.
CPC .............. G03B 13/22 (2013.01); G03B 17/12 (2013.01); G03B 17/14 (2013.01); H04N 5/00 (2013.01); H04N 5/23209 (2013.01); H04N 5/23258 (2013.01); G03B 2205/0015 (2013.01)

(58) Field of Classification Search
CPC .... H04N 5/23264; G03B 17/12; G03B 13/22; G03B 17/14; G03B 5/00; G03B 2205/0015; G02B 27/646
See application file for complete search history.

(56) References Cited

U.S. PATENT DOCUMENTS

| 2016/0330378 A1* | 11/2016 | Tsuchiya | H04N 5/23258 |
| 2017/0019600 A1* | 1/2017 | Koyano | G03B 17/14 |

FOREIGN PATENT DOCUMENTS

| CN | 104717403 A | 6/2015 |
| CN | 105376475 A | 3/2016 |
| CN | 105874383 A | 8/2016 |
| CN | 106353949 A | 1/2017 |
| JP | 2009265182 A | 11/2009 |
| JP | 2015194712 A | 11/2015 |

OTHER PUBLICATIONS

Wang. "The development of image stabilization technique and measurement for digital camera." China Academic Journal Electronic Publishing House. 2016: 67-70. English abstract provided.

Extended European Search Report issued in European Application No. 19162134.1 dated Aug. 7, 2019.

Office Action issued in Chinese Appln. No. 201910193595.X dated Aug. 18, 2021. English translation provided.

* cited by examiner

LENS APPARATUS, CAMERA, CONTROL METHOD, AND STORAGE MEDIUM

BACKGROUND OF THE INVENTION

Field of the Invention

The present invention relates to an optical apparatus, such as an interchangeable lens and a camera, used for an imaging system having an image stabilization function.

Description of the Related Art

Some lens interchangeable imaging systems having an image stabilization function that optically reduces (corrects) an image blur move a correction lens provided in an interchangeable lens relative to an optical axis and an image sensor provided to a camera relative to the optical axis. However, when any one of them reaches the maximum movable amount due to mechanical and electrical restrictions on movable amounts of the correction lens and the image sensor, the image stabilization is no longer available.

Japanese Patent Laid-Open No. ("JP") 2009-265182 discloses an imaging system that changes a ratio (correction ratio) between a correction amount by moving an image sensor on a camera side and a correction amount by moving the correction lens on an interchangeable lens side in accordance with an image stabilization amount. More specifically, the image is stabilized prior to imaging (exposure) by moving only the correction lens, and the image is stabilized during the imaging by moving both the correction lens and the image sensor. Then, the camera starts controlling the movement of the image sensor for the image stabilization after moving the image sensor in accordance with the position of the correction lens when the imaging starts.

JP 2015-194712 discloses an imaging system that starts controlling the movement of the correction lens for the image stabilization after moving the correction lens to its movement center when the imaging starts.

However, as disclosed in JP 2009-265182, the movement control for the image stabilization starting after the image sensor is moved according to the position of the correction lens cannot maximize the movable range of the image sensor. The movement control of the image sensor may be started with its movement center. The imaging system disclosed in JP 2009-265182 needs to constant communications between the camera and the interchangeable lens so as to control the correction ratio according to the image stabilization amount, increasing the traffic and delaying the image stabilization.

In addition, moving the correction lens to the movement center when the imaging starts as disclosed in JP 2015-194712 unnaturally changes the angle of view.

SUMMARY OF THE INVENTION

The present invention provides a lens apparatus, a camera, a control method, and a storage medium, each of which can suppress a traffic increase between a camera and an interchangeable lens and stabilize an image by moving a correction lens and an image sensor without unnaturally changing an angle of view.

A lens apparatus according to one aspect of the present invention for a camera system which includes a camera including a first correction unit movable for an image stabilization is attachable to and detachable from the camera. The lens apparatus includes a second correction unit movable for the image stabilization, and a setting unit. The camera system moves one correction unit of the first correction unit and the second correction unit and does not move the other correction unit in the image stabilization before imaging for recording starts, and moves the first correction unit and the second correction unit in the image stabilization during the imaging for recording, and the setting unit sets information on a correction ratio between the first correction unit and the second correction unit for each direction of the one correction unit from a position of the one correction unit when the imaging for recording starts. Alternatively, the lens apparatus includes a receiving unit and a control unit. The receiving unit receives from the camera information on a correction ratio between the first correction unit and the second correction unit set for each direction of the one correction unit from a position of the one correction unit when the imaging for recording starts, and the control unit controls a movement of the second correction unit based on the information received by the receiving unit. The lens apparatus may include a control unit, and the control unit may move the second correction unit such that a ratio of a correction amount of the second correction unit to a total image stabilization amount during imaging for recording is smaller than that prior to the imaging for recording, and the ratio is different for each direction from a position of the second correction unit when the imaging for recording starts.

A camera according to another aspect of the present invention for a camera system which includes a lens apparatus including a second correction unit movable for an image stabilization, and the camera to which the lens apparatus is detachably attached. The camera includes a first correction unit movable for an image stabilization, and a receiving unit, and a control unit. The camera system moves one correction unit of the first correction unit and the second correction unit and does not move the other correction unit in the image stabilization before imaging for recording starts, and moves the first correction unit and the second correction unit in the image stabilization during the imaging for recording, the receiving unit receives from the lens apparatus information on a correction ratio between the first correction unit and the second correction unit set for each direction of the one correction unit from a position of the one correction unit when the imaging for recording starts, and the control unit controls a movement of the first correction unit based on the information received by the receiving unit. Alternatively, the camera further includes a setting unit configured to set information on a correction ratio between the first correction unit and the second correction unit for each direction of the one correction unit from a position of the one correction unit when the imaging for recording starts. The camera may include a control unit, and the control unit may move the second correction unit such that a ratio of a correction amount of the first correction unit to a total image stabilization amount during imaging for recording is smaller than that prior to the imaging for recording, and the ratio is different for each direction from a first position of the first correction unit when the imaging for recording starts.

A control method for each of the above lens apparatus and the above camera also constitutes another aspect of the present invention. A non-transitory computer-readable storage medium storing a computer program that enables a computer to execute the control method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
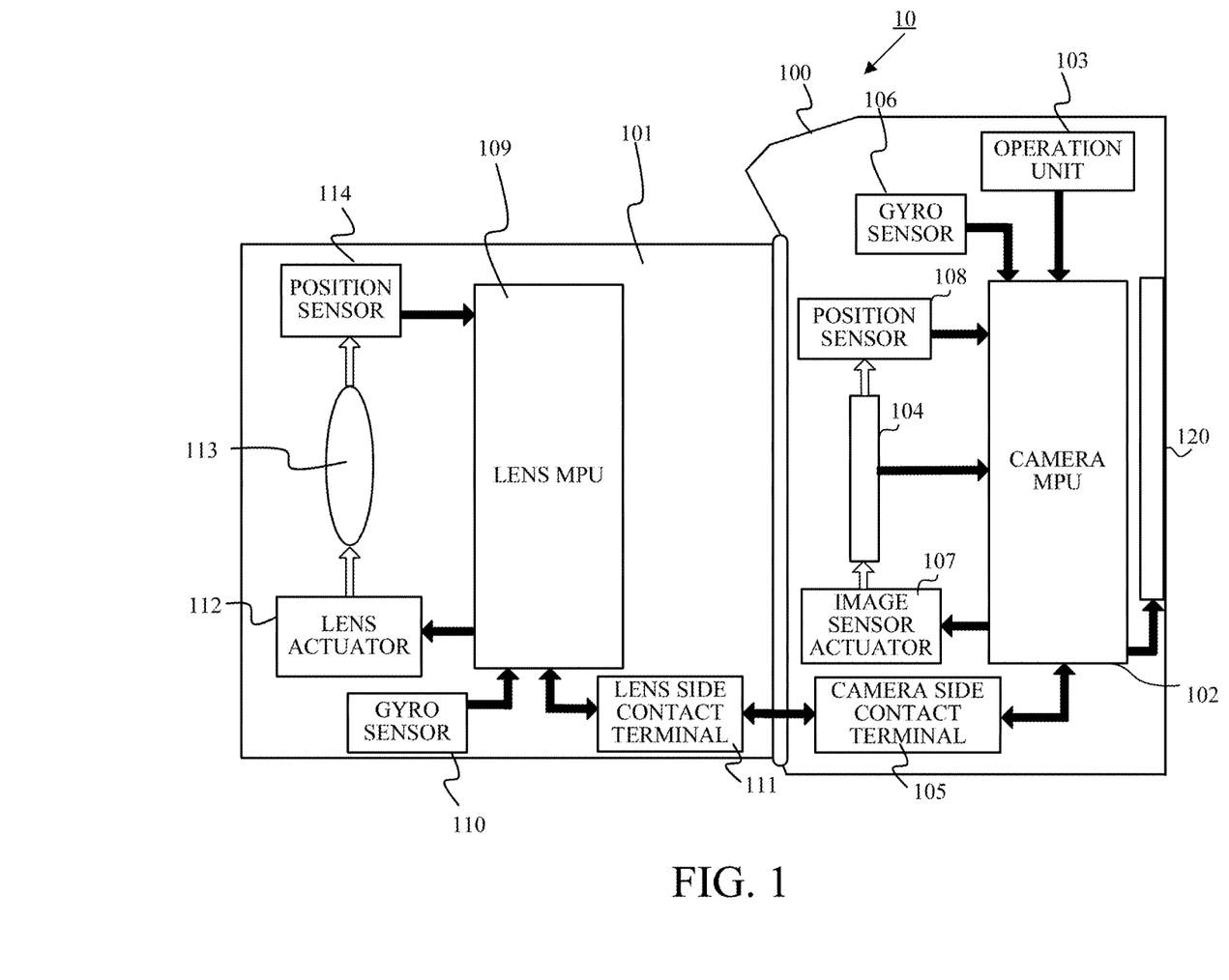
FIG. 1 is a block diagram illustrating a configuration of an imaging system according to a first embodiment of the present invention.

FIG. 1 illustrates a configuration of an imaging system 10 according to one embodiment of the present invention. The imaging system 10 includes an interchangeable lens 101 as a first optical apparatus and a camera body 100 as a second optical apparatus to which the interchangeable lens 101 is detachably attached and communicably connected. The camera body 100 includes a camera MPU 102, an operation unit 103, an image sensor 104, a camera side contact terminal 105, a camera side gyro sensor 106, and a rear display 120.

The camera MPU 102 is a controller that governs overall controls of the camera body 100 and the interchangeable lens 101, and controls a variety of operations such as AE, AF, and imaging in response to an input from the operation unit 103 as described later. The camera MPU 102 communicates various commands and information with the lens MPU 109 through the camera side contact terminal 105 and a lens side contact terminal 111 provided to the interchangeable lens 101. The camera side contact terminal 105 and the lens side contact terminal 111 also include power supply terminals for supplying the power from the camera body 100 to the interchangeable lens 101.

The operation unit 103 has a mode dial for setting a variety of imaging modes, a release button for instructing an imaging preparation operation and an imaging start, and the like. A first switch (SW1) is turned on by half-pressing the release button, and a second switch (SW2) is turned on by fully pressing it. When the SW1 turns on, the AE and AF are performed as the imaging preparation operation, and when the SW2 turns on, starting the imaging (exposure) is instructed and the imaging starts a predetermined time after this instruction. The camera MPU 102 notifies the lens MPU 109 of the turning on and off of the SW1 and SW2 through the communication.

The image sensor 104 includes a photoelectric conversion element, such as a CCD sensor or a CMOS sensor, and photoelectrically converts an object image formed by an imaging optical system, which will be described later, to generate an image capturing signal. The camera MPU 102 generates an image signal using the image capturing signal from the image sensor 104.

The camera side gyro sensor 106 is a shake sensor that detects a camera shake detection signal as an angular velocity signal by detecting an angular shake (camera shake) of the camera body 100 due to manual shaking or the like. Based on the camera shake detection signal and an IIS correction ratio (which will be described later) received from the interchangeable lens 101, the camera MPU 102 drives an image sensor actuator 107 to move the image sensor 104 in a direction orthogonal to the optical axis in the imaging optical system. Thereby, an image blur caused by the camera shake is reduced (corrected). Then, the camera MPU 102 performs a feedback control over the image sensor actuator 107 so that the position of the image sensor 104 (a moving amount from the position on the optical axis as the movement center) detected by an image sensor position sensor 108 approaches to a target position. Thereby, the image is stabilized by moving the image sensor 104 (referred to as IIS hereinafter). The IIS is performed for the camera shake in the vertical direction (pitch direction) and the camera shake in the horizontal direction (yaw direction).

The rear display 120 as the display unit displays an image corresponding to the image signal generated by the camera MPU 102 using the image capturing signal from the image sensor 104. Prior to imaging, the user can observe the displayed image as a finder image (live-view image). After imaging, the rear display 120 can display a still image or motion image for recording generated by imaging. "Imaging" in this embodiment means imaging for recording.

The interchangeable lens 101 includes an unillustrated imaging optical system, the lens MPU 109, the lens side contact terminal 111, and the lens side gyro sensor 110. The lens side gyro sensor 110 is a shake sensor that detects an angular vibration (lens shake) of the interchangeable lens 101 and outputs a lens shake detection signal as an angular velocity signal.

The lens MPU 109 drives a lens actuator 112 based on the lens shake detection signal and an OIS correction ratio, which will be described later, to move the correction lens 113 which is part of the imaging optical system in the direction orthogonal to the optical axis in the imaging optical system. Thereby, an image blur caused by the lens shake is reduced (corrected). Then, the lens MPU 109 performs the feedback control over the lens actuator 112 so that the position of the correction lens 113 (a moving amount from the position on the optical axis as the movement center) detected by a lens position sensor 114 approaches to a target position. Thereby, the image is stabilized by moving the correction lens 113 (referred to as OIS hereinafter).

The lens MPU 109 serves as a setting unit configured to set information on a correction ratio to be described later. It also serves as a receiving unit configured to receive information necessary to set the information from the camera MPU 102. It also serves as a transmitting unit configured to transmit information on the set correction ratio to the camera MPU 102.

Similar to the IIS, the OIS is performed for the lens shake in the pitch direction and the lens shake in the yaw direction. As long as the correction lens 113 moves in a direction orthogonal to the optical axis, it may parallel move within a plane orthogonal to the optical axis or rotate around a point on the optical axis and move in the direction.

Figure 2:
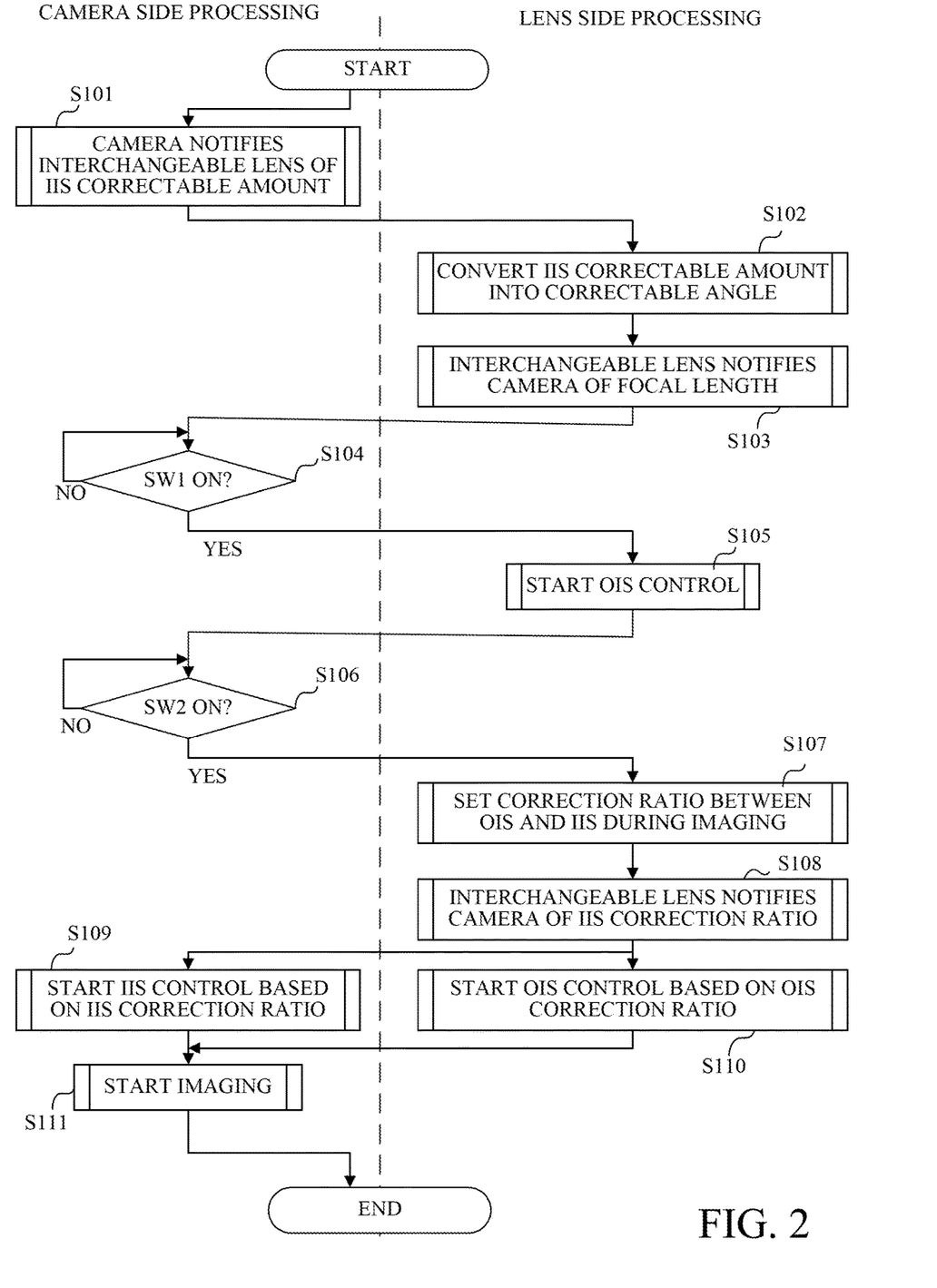
FIG. 2 is a flowchart illustrating image stabilization processing according to the first embodiment.

Referring now to a flowchart in FIG. 2, a description will be given of image stabilization processing (control method) in the imaging system 10 according to this embodiment. FIG. 2 illustrates a process performed by the camera body 100 (the camera MPU 102) on its left side, and a process performed by the interchangeable lens 101 (lens MPU 109) on its right side. The camera MPU 102 and the lens MPU 109 execute image stabilization processing in accordance with a computer program. When the camera body 100 is powered on, the power is supplied to the interchangeable lens 101, and the communication starts between the camera MPU 102 and the lens MPU 109, this processing starts with the step S101.

In the step S101, the camera MPU 102 notifies (transmits) the lens MPU 109 of an IIS correctable amount as the maximum movement amount capable of the image stabilization by moving the image sensor 104 in the IIS. The IIS correctable amount is the maximum image stabilization amount obtained by moving the image sensor 104 from the movement center to the mechanical or electrical movable end, and has a unit of a length (mm).

Next, in the step S102, the lens MPU 109 converts the IIS correctable amount notified from the camera MPU 102 into an IIS correctable angle (deg) as an angular converted value. The lens MPU 109 stores in an unillustrated memory an OIS correctable angle as a maximum angle (degrees) at which the image stabilization can be performed by moving the correction lens 113 in the OIS. The OIS correctable angle (the angle converted value of the IIS correctable amount) is the maximum image stabilization amount (angle) obtained by moving the correction lens 113 from the movement center to the mechanical or electrical movable end.

In this embodiment, the camera MPU 102 notifies the lens MPU 109 of the IIS correctable amount without any angular conversions. This is because the camera MPU 102 needs to acquire information on a focal length of the imaging optical system from the lens MPU 109 by the communication beforehand in order for the camera MPU 102 to calculate the angle converted value of the IIS correctable amount. When the information on the focal length of the imaging optical system when the imaging starts is acquired from the lens MPU 109, the lens MPU 109 may be notified of a value obtained by converting the IIS correctable amount into an angle.

Next, in the step S103, the lens MPU 109 notifies the camera MPU 102 of the information on the focal length of the imaging optical system. The information on the focal length is necessary to convert the image stabilization angle by moving the image sensor 104 into a moving amount of the image sensor 104 in the IIS control.

Since this embodiment performs the IIS control only during the exposure (during imaging for recording), the camera MPU 102 may be notified of the information on the focal length in a period from the step S101 to S109 (IIS control start) described later.

Next, in the step S104, the camera MPU 102 determines whether or not the SW1 is turned on. When it is turned on, the camera MPU 102 notifies the lens MPU 109 of turning on of the SW1.

In the step S105, the lens MPU 109 receiving the notification of turning on of the SW1 starts controlling the OIS in accordance with the lens shake detected by the lens side gyro sensor 110. That is, in the viewfinder observation state in which the live-view image is displayed prior to the imaging, the image stabilization is performed only with the correction lens 113 as the first correction unit, and the image stabilization by the image sensor 104 as the second correction unit is not performed.

Next, in the step S106, the camera MPU 102 determines whether or not the SW2 is turned on. When it is turned on, the camera MPU 102 notifies the lens MPU 109 of turning on of the SW2.

In the step S107, the lens MPU 109 as the setting unit receiving the notification of turning on of the SW2 acquires from the lens position sensor 114 the position of the correction lens 113 when the imaging starts.

Information on the correction ratio between the correction lens 113 and the image sensor 104 is set for each direction of the correction lens 113 with respect to the position of the correction lens 113 when the imaging starts. The information on the correction ratio may be "the correction amount (shift amount) of the correction lens 113: the correction amount (shift amount) of the image sensor 104", or "the angle converted value of the correction amount (shift amount) of the correction lens 113: the angle converted value of the correction amount (shift amount) of the image sensor 104." Alternatively, it may be "an amount indicating the ratio of the correction amount of the correction lens 113 to the total image stabilization amount and an amount indicating the ratio of the correction amount of the image sensor 104 to the total image stabilization amount" which can be calculated using the above values. It may be "an angle converted value of the correction amount of the correction lens 113 to the angle converted value of the total image stabilization amount and an angle converted value of the correction amount of the image sensor 104 to the angle converted value of the total image stabilization amount." Any information that can derive the above information may also be used.

In this embodiment, the image stabilization amount per unit moving amount [mm] of the correction lens 113 is different from the image stabilization amount per unit moving amount [mm] of the image sensor 104. In order to adjust these dimensions, information on the above correction ratio is calculated using the angle converted value of the OIS correctable amount and the angle converted value of the IIS correctable amount.

Information on the correction ratio between the OIS and the IIS during imaging is set using the angle converted value $\Delta\theta_{OIS}$ corresponding to the position of the correction lens 113 when the imaging starts, the OIS correctable angle $\theta_{OIS}$, and the IIS correctable angle $\theta_{IIS}$.

Since the image sensor 104 is located on the optical axis as the movement center when the imaging starts, the IIS correctable angle $\theta_{IIS}$ is the same where the image sensor 104 moves to the + side (IIS+ region) from the optical axis and where it moves to the opposite side or the − side (IIS− region). Hereinafter, the IIS correctable angle $\theta_{IIS}$ when the image sensor 104 moves to the + side will be expressed as IIS+ correctable angle $\theta_{IIS}^+$, and the IIS correctable angle $\theta_{IIS}$ when moving to the minus side will be expressed as IIS− correctable angle $\theta_{IIS}^-$.

On the other hand, when the imaging starts, the correction lens 113 may be located on the + side (OIS+ region) from the optical axis as the movement center and the − side (OIS− region) on the opposite side. Depending on whether the position $\Delta\theta_{OIS}$ of the correction lens 113 is located on the + side or the − side, the OIS correctable angle (OIS+ correctable angle) $\theta_{OIS}^+$ when the correction lens 113 is moved to the + side (first direction side) and the OIS correctable angle (OIS− correctable angle) $\theta_{OIS}^-$ when it is moved to the − side (second direction side) are different from each other as follows:

IIS+ correctable angle $\theta_{IIS}^+$:$\theta_{IIS}$
IIS− correctable angle $\theta_{IIS}^-$:$\theta_{IIS}$
OIS+ correctable angle $\theta_{OIS}^+$:$\theta_{OIS}-\Delta\theta_{OIS}$
OIS− correctable angle $\theta_{OIS}^-$:$\theta_{OIS}+\Delta\theta_{OIS}$ In this embodiment, the OIS correction ratio is a ratio of an image stabilization amount by moving the correction lens 113 (referred to as an OIS correction amount hereinafter) to the total image stabilization amount (angle deg) by moving the correction lens 113 and the image sensor 104 when both OIS and IIS are performed. The IIS correction ratio indicates a ratio of the image stabilization amount (referred to as an IIS correction amount hereinafter) by moving the image sensor 104 to the total image stabilization amount.

The OIS+ correction ratio as the correction ratio of the correction lens 113 when the correction lens 113 is located on the + side of the position of the correction lens 113 when the imaging starts, the OIS− correction ratio, the IIS+ correction ratio and IIS− correction ratio corresponding to the moving direction of the image sensor 104 (+ side and − side) are calculated as follows:

OIS+ correction ratio: $\theta_{OIS}^+/(\theta_{IIS}^+ +\theta_{OIS}^+)$
OIS− correction ratio: $\theta_{OIS}^-/(\theta_{IIS}^- +\theta_{OIS}^-)$
IIS+ correction ratio: $\theta_{IIS}^+/(\theta_{IIS}^+ +\theta_{OIS}^+)$
IIS− correction ratio: $\theta_{IIS}^-/(\theta_{IIS}^- +\theta_{OIS}^-)$ Next, in the step S108, the lens MPU 109 notifies the camera MPU 102 of the IIS correction ratio (IIS+ and IIS− correction ratios) set in the step S107.

In the step S109, the camera MPU 102 starts controlling the IIS using the IIS correction ratio received from the lens MPU 109. More specifically, the camera MPU 102 calculates the IIS correction amount as the moving amount of the image sensor 104 based on the camera shake detected by the camera side gyro sensor 106 and the IIS correction ratio. Then, the image sensor actuator 107 is controlled so as to move the image sensor 104 to the target position corresponding to the IIS correction amount.

Simultaneously, in the step S110, the lens MPU 109 starts controlling the OIS using the OIS correction ratio (OIS+ correction ratio and OIS− correction ratio) set in the step S107. More specifically, the OIS correction amount as the moving amount (shift amount) of the correction lens 113 is calculated based on the lens shake detected by the lens side gyro sensor 110 and the OIS correction ratio. Then, the lens actuator 112 is controlled so as to move the correction lens 113 to the target position corresponding to the OIS correction amount.

The camera MPU 102 starts imaging (exposure) in the step S111. Thereby, the cooperative image stabilization by the OIS and IIS or both of the correction lens 113 and the image sensor 104 is performed during the imaging.

In this specification, the imaging may start when the imaging is instructed by turning on the SW2 in the step S106, or within a period after the imaging is instructed by turning on the SW2 and before the imaging starts at the step S111. The correction lens 113 may be located at a fixed position until the imaging starts in the step S111 if the imaging is instructed by turning on the SW2 in the step S106. This also applies to other embodiments to be described later.

Figure 3:
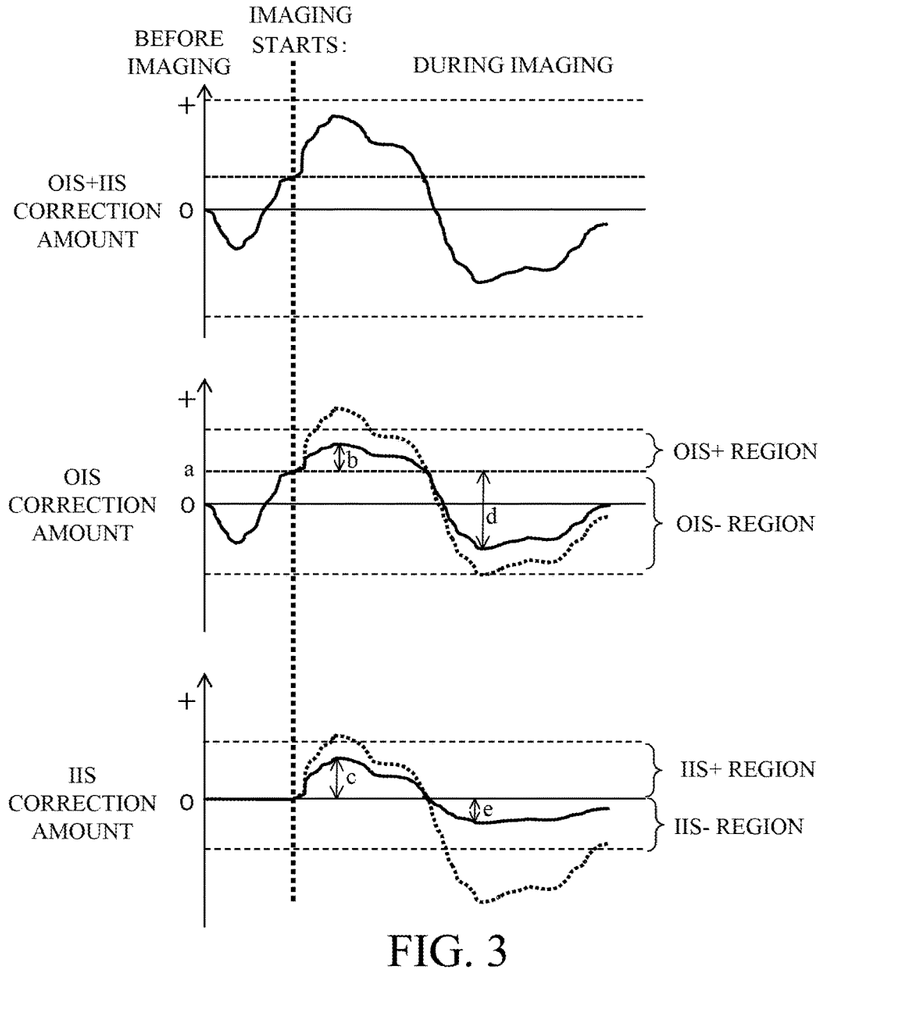
FIG. 3 illustrates an illustrative image stabilization by moving a correction lens and an image sensor according to a second embodiment.

Referring now to FIG. 3, a description will be given of the cooperative image stabilization by the OIS and IIS. The middle part in FIG. 3 illustrates a change in the OIS correction amount before and after the imaging starts by a solid line. The bottom part in FIG. 3 illustrates a change in the IIS correction amount before and after the imaging starts by a solid line. The top part in FIG. 3 illustrates the total correction amount as a sum of the OIS correction amount illustrated in the middle part and the IIS correction amount illustrated in the bottom part, and the total correction amount is indicated by a dotted line in each of the middle part and the bottom part. In these figures, 0 indicates the center positions (the position on the optical axis or on-axis position) of the correction lens 113 and the image sensor 104 in their movable ranges. FIG. 3 illustrates changes in the OIS correction amount and the IIS correction amount in the pitch direction or the yaw direction.

As described above, only the OIS is performed before the imaging starts, and the correction lens 113 is moved within the movable range in accordance with the detected lens shake. No IIS is performed at this time, and the image sensor 104 is held at its center position. When the imaging starts as the SW2 turns on, the correction lens 113 is moved from the center position to position a.

After the imaging starts (during the imaging), the correction lens 113 is moved in accordance with the lens shake in the OIS+ region and the OIS− region with the position a as a reference. On the other hand, in the IIS that starts as the imaging starts, the image sensor 104 is moved in accordance with the camera shake in the IIS+ region and the IIS− region with the center position as a reference. The OIS+ correction ratio as the OIS correction ratio when the correction lens 113 moves in the OIS+ region is different from the OIS− correction ratio when the correction lens 113 moves in the OIS− region.

That is, in this embodiment, the lens MPU 109 varies the OIS correction ratio according to the direction in which the correction lens 113 moves from the position a when the imaging starts. Since the OIS+ correction ratio is different from the OIS− correction ratio, the IIS+ correction ratio as the IIS correction ratio when the image sensor 104 moves in the IIS+ region, and the IIS− correction when the image sensor 104 moves in the IIS− region are also different from each other.

Figure 4:
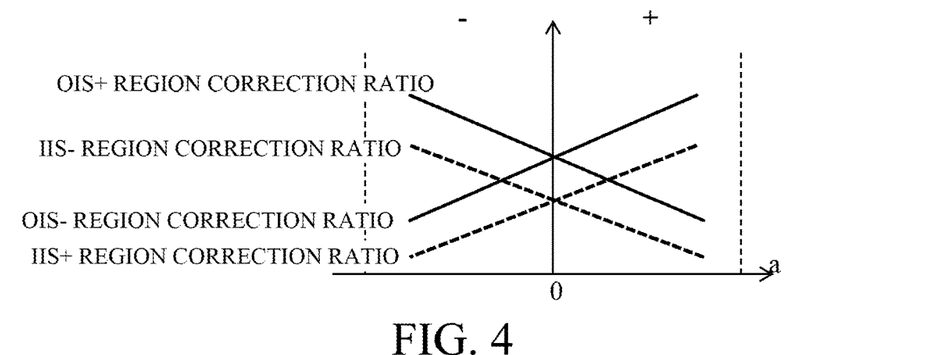
FIG. 4 illustrates an illustrative correction ratio setting according to the first embodiment.

FIG. 4 illustrates the OIS+ and OIS− correction ratios and the IIS+ and IIS− correction ratios according to the position a of the correction lens 113 when the imaging starts. As the position a of the correction lens 113 when the imaging starts separates from the center position 0 in the + direction, the OIS+ correction ratio is set smaller, the IIS+ correction ratio is set larger, the OIS− correction ratio is set larger, and the IIS− correction ratio is set smaller. On the other hand, as the position a moves away from the center position 0 in the − direction, the OIS− correction ratio is set smaller, the IIS− correction ratio is set larger, the OIS+ correction ratio is set larger, and the IIS+ correction ratio is set smaller. One of the + direction and the − direction corresponds to the first direction and the other corresponds to the second direction opposite to the first direction.

For example, as illustrated in FIG. 3, where the position a of the correction lens 113 when the imaging starts separates from the center position 0 in the + direction, the OIS+ correction ratio b:the IIS+ correction ratio c when the image stabilization is performed in the + direction satisfy b<c (such as 1:2). The OIS− correction ratio c:IIS− correction ratio d when the image stabilization is performed in the − direction is c>d (such as 2:1).

As described above, in this embodiment, the OIS correction ratio and the IIS correction ratio during imaging are set according to the moving direction of the correction lens 113 from the position of the correction lens 113 when the imaging starts. In other words, the OIS correction ratio and the IIS correction ratio during imaging are sets according to a side which the correction lens 113 exists during imaging with respect to the position of the correction lens 113 when the imaging starts. Thereby, the image can be stabilized utilizing the movable ranges of the correction lens 113 and the image sensor 104 during imaging without unnaturally changing the angle of view when the imaging starts. Moreover, since the interchangeable lens 101 that performs the image stabilization prior to imaging sets the OIS correction ratio and the IIS correction ratio, it becomes unnecessary to communicate the position of the correction lens 113 from the interchangeable lens 101 to the camera body 100 when the imaging starts. Therefore, the traffic increase is restrained.

In this embodiment, the interchangeable lens 101 provides the image stabilization prior to imaging. Since the camera MPU 102 performs a variety of processes and calculations for controlling the entire imaging system, moving the image sensor 104 for the image stabilization in the camera body 100 prior to imaging would increase the burden of the camera MPU 102.

When the state of the imaging optical system changes during imaging, such as a focus state, and a zoom state (focal length), the IIS correction amount and the OIS correction amount are recalculated. This also applies to other embodiments.

The lens MPU 109 may change the OIS correction ratio and the IIS correction ratio, transmit the changed IIS correction ratio to the camera MPU 102, and cause the camera MPU 102 to perform the IIS according to the changed IIS correction ratio.

Second Embodiment

According to a second embodiment of the present invention, the camera body 100 as the first optical apparatus sets the OIS correction amount and the IIS correction ratio using the OIS correctable angle, the position of the correction lens 113, and the IIS correctable angle received by from the interchangeable lens 101 as the second optical apparatus. Then, the interchangeable lens performs the OIS according to the OIS correction ratio received from the camera body. The configuration of the imaging system according to the second embodiment is the same as that of the first embodiment, and thus corresponding elements will be designated by the same reference numerals as in the first embodiment and a description thereof will be omitted.

The camera MPU 102 serves as a setting unit configured to set information on the correction ratio. It also serves as a receiving unit configured to receiving information necessary to set the information from the lens MPU 109. It also serves as a transmitting unit configured to transmit information on the set correction ratio to the lens MPU 109.

Figure 5:
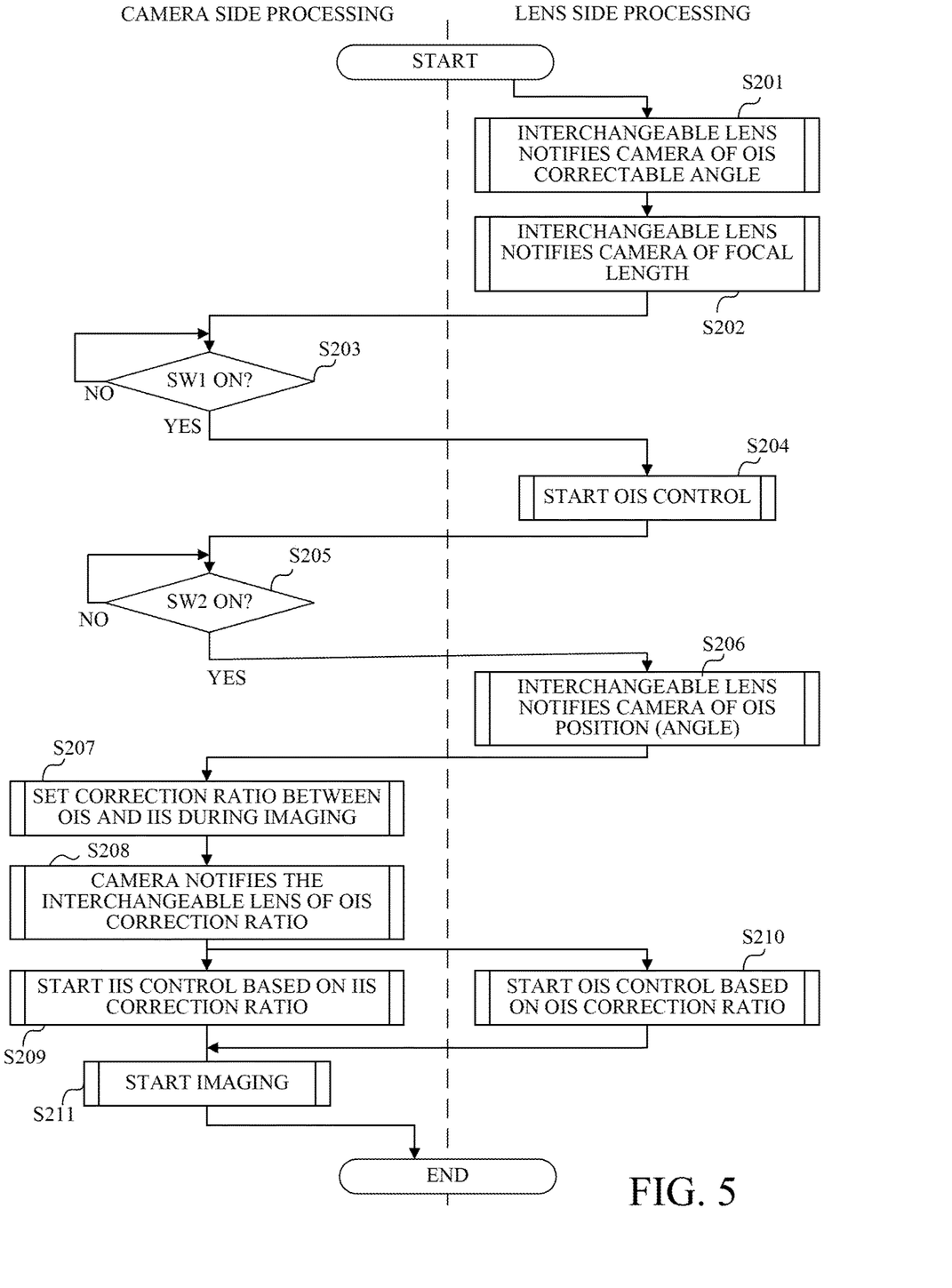
FIG. 5 is a flowchart illustrating the image stabilization processing according to the second embodiment of the present invention.

Referring to a flowchart in FIG. 5, a description will be given of image stabilization processing (control method) in the imaging system 10 according to the second embodiment. FIG. 5 illustrates the processing performed by the camera body 100 (the camera MPU 102) on the left side, and the processing performed by the interchangeable lens 101 (lens MPU 109) on the right side. The camera MPU 102 and the lens MPU 109 execute the image stabilization processing in accordance with a computer program. When the camera body 100 is powered on, the power is supplied to the interchangeable lens 101, and the communication starts between the camera MPU 102 and the lens MPU 109, this processing starts with the step S201.

In the step S201, the lens MPU 109 notifies (sends) the camera MPU 102 of the OIS correctable angle.

Next, in the step S202, the lens MPU 109 notifies the camera MPU 102 of the information on the focal length of the imaging optical system. This is because of the reason described in the step S103 in the first embodiment. Since this embodiment performs the IIS control only during the exposure, the camera MPU 102 may be notified of information on the focal length in a period from the step S201 or the step S207 (correction ratio determination) described later.

Next, in the step S203, the camera MPU 102 determines whether or not the SW1 is turned on. When it is turned on, the camera MPU 102 notifies the lens MPU 109 of turning on of the SW1.

In the step S204, the lens MPU 109 having received the notification of turning on of the SW1 starts controlling the OIS based on the lens shake detected by the lens side gyro sensor 110. That is, in the viewfinder observation state in which the live-view image is displayed prior to imaging, the image stabilization is performed only by the correction lens 113 as the first correction unit, and the image stabilization by the image sensor 104 as the second correction unit is not performed.

Next, in the step S205, the camera MPU 102 determines whether or not the SW2 is turned on. When it is turned on, the camera MPU 102 notifies the lens MPU 109 of turning on of the SW2.

Next, in the step S206, the lens MPU 109 receiving the notification of turning on of the SW2 acquires the position of the correction lens 113 when the imaging starts from the lens position sensor 114, and notifies the camera MPU 102 of the angle converted value $\Delta\theta_{OIS}$ of the position of the correction lens 113.

Next, in the step S207, the camera MPU 102 serving as setting unit sets the OIS correction ratio and the IIS correction ratio during imaging using the angle converted value $\Delta\theta_{OIS}$ of the position of the correction lens 113, the OIS correctable angle $\theta_{OIS}$ obtained in the step S201, and the IIS correctable angle $\theta_{IIS}$. The camera MPU 102 calculates the IIS correctable angle from the focal length. The OIS correction ratio and the IIS correction ratio during imaging are set (calculated) as described in the step S107 in the first embodiment.

In the step S208, the camera MPU 102 notifies the lens MPU 109 of the OIS correction ratio (OIS+ correction ratio and OIS− correction ratio) set in the step S207.

In the step S209, the camera MPU 102 starts controlling the IIS using the IIS correction ratio (IIS+ correction ratio and IIS− correction ratio) similar to the step S109 in the first embodiment.

Simultaneously, in the step S210, the lens MPU 109 starts controlling the OIS using the OIS correction ratio received from the camera MPU 102 in the same manner as the step S110 in the first embodiment.

The camera MPU 102 starts imaging (exposure) in the step S211. Thereby, the cooperative image stabilization by OIS and IIS or both of the correction lens 113 and the image sensor 104 is performed during imaging.

This embodiment sets the OIS correction ratio and the IIS correction ratio during imaging in accordance with the moving direction of the correction lens 113 from the position of the correction lens 113 when the imaging starts. Thereby, the image can be stabilized utilizing the movable ranges of the correction lens 113 and the image sensor 104 during imaging without unnaturally changing the angle of view when the imaging starts.

In this embodiment, the interchangeable lens 101 notifies the camera body 100 of the angle converted value as the OIS correctable angle. If the interchangeable lens 101 notifies the camera body 100 of the maximum movement amount [mm] of the correction lens 113, information of the image stabilization sensitivity (sensitivity for converting the movement amount [mm] of the correction lens into the angle [deg]) needs to be separately sent to the camera body 100. Hence, in order to reduce the number of communications, the interchangeable lens 101 needs to notify the camera body 100 of the OIS correctable angle.

Third Embodiment

In the third embodiment of the present invention, similar to the second embodiment, the camera body 100 as the first optical apparatus sets the OIS and IIS correction ratios using the OIS correctable angle, the position of the correction lens 113, and the IIS correctable angle received from the interchangeable lens 101 as the second optical apparatus. Then, the interchangeable lens performs the OIS according to the OIS correction ratio received from the camera body. However, the third embodiment stabilizes the image only with the image sensor 104 as the first correction unit prior to imaging, and does not stabilize the image with the correction lens 113 as the second correction unit. The configuration of the imaging system of the third embodiment is the same as that of the first embodiment, and corresponding elements will be designated by the same reference numerals as those of the first embodiment and a description thereof will be omitted.

Figure 6:
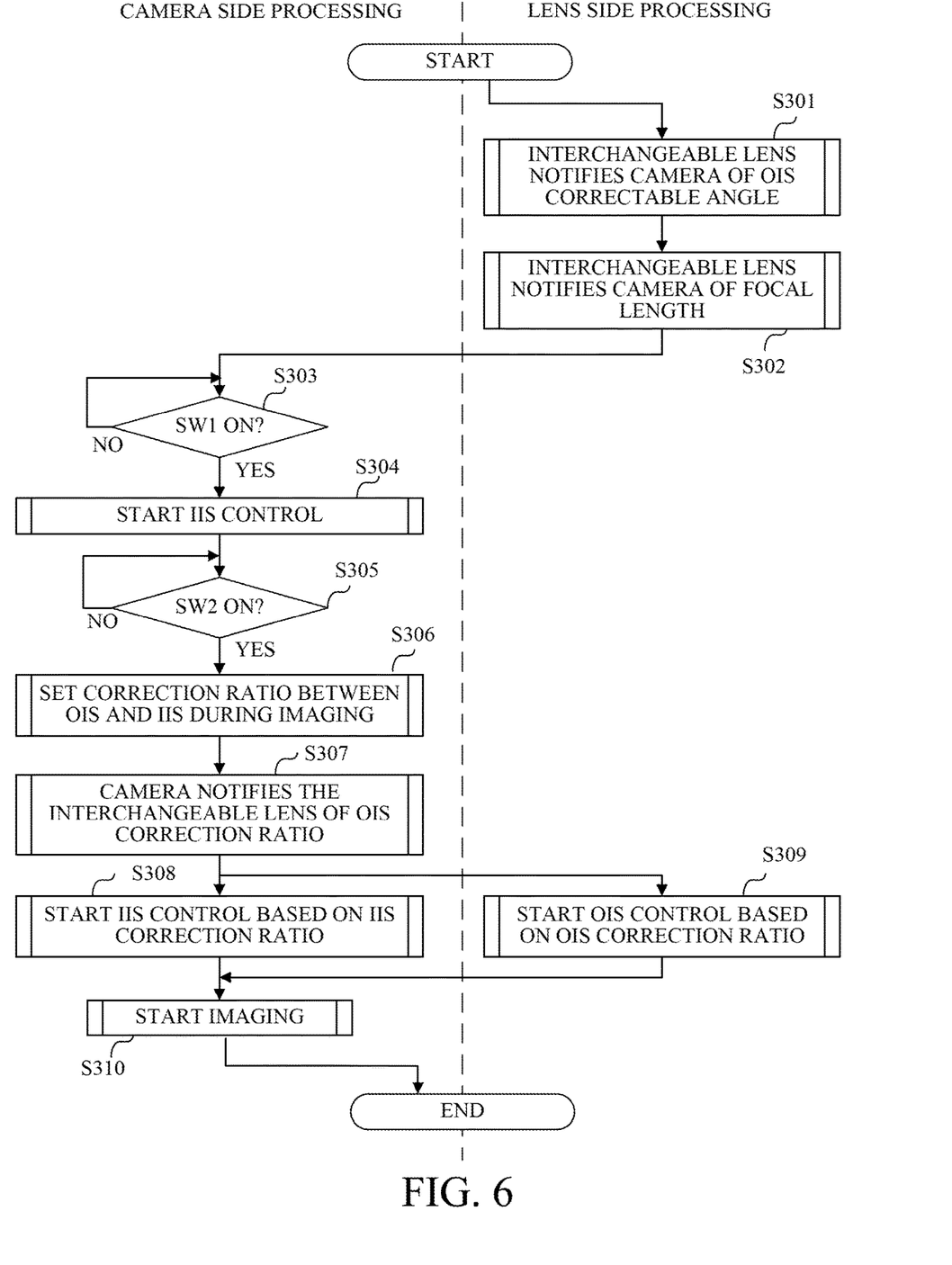
FIG. 6 is a flowchart illustrating the image stabilization processing according to a third embodiment of the present invention.

Referring to a flowchart in FIG. 6, a description will be given of image stabilization processing (control method) in the imaging system 10 according to the third embodiment. FIG. 6 illustrates the processing performed by the camera body 100 (the camera MPU 102) on the left side, and the processing performed by the interchangeable lens 101 (lens MPU 109) on the right side. The camera MPU 102 and the lens MPU 109 execute the image stabilization processing in accordance with a computer program. When the camera body 100 is powered on, the power is supplied to the interchangeable lens 101, and the further communication starts between the camera MPU 102 and the lens MPU 109, this processing starts with the step S301.

In the step S301, the lens MPU 109 notifies (sends) the camera MPU 102 of the OIS correctable angle.

Next, in the step S302, the lens MPU 109 notifies the camera MPU 102 of the information on the focal length of the imaging optical system. This is because of the reason described in the step S102 in the first embodiment.

Next, in the step S303, the camera MPU 102 determines whether or not the SW1 is turned on, and proceeds to the step S304 when it is turned on.

In the step S304, the camera MPU 102 starts controlling the IIS. At this time, no OIS control is provided.

Next, in the step S305, the camera MPU 102 determines whether or not the SW2 is turned on. If it is turned on, the camera MPU 102 proceeds to the step S306.

In the step S306, the camera MPU 102 serving as setting unit acquires from the image sensor position sensor 108 the position of the image sensor 104 when the imaging starts. Then, the OIS correction ratio and the IIS correction ratio during imaging are set as follows using the angle converted value $\Delta\theta_{IIS}$ of the position of the image sensor 104 when the imaging starts, the IIS correctable angle $\theta_{IIS}$ ($\theta_{IIS}^+$, $\theta_{IIS}^-$), and the OIS correctable angle $\theta_{OIS}$ ($\theta_{OIS}^+$, $\theta_{OIS}^-$). This embodiment sets as follows:

IIS+ correctable angle $\theta_{IIS}^+:\theta_{IIS}-\Delta\theta_{IIS}$
IIS− correctable angle $\theta_{IIS}^-:\theta_{IIS}+\Delta\theta_{IIS}$
OIS+ correctable angle $\theta_{OIS}^+:\theta_{OIS}$
OIS− correctable angle $\theta_{OIS}^-:\theta_{OIS}$
IIS+ correction ratio: $\theta_{IIS}^+/(\theta_{IIS}^++\theta_{OIS}^+)$
IIS− correction ratio: $\theta_{IIS}^-/(\theta_{IIS}^-+\theta_{OIS}^-)$
OIS+ correction ratio: $\theta_{OIS}^+/(\theta_{IIS}^++\theta_{OIS}^+)$
OIS correction ratio: $\theta_{OIS}^-/(\theta_{IIS}^-+\theta_{OIS}^-)$ Next, in the step S307, the camera MPU 102 notifies the lens MPU 109 of the OIS correction ratio (OIS+ correction ratio and OIS− correction ratio) set in the step S306.

Next, in the step S308, the camera MPU 102 starts controlling the IIS using the IIS correction ratio (IIS+ correction ratio and IIS− correction ratio) similar to the step S109 in the first embodiment.

Simultaneously, in the step S309, the lens MPU 109 starts controlling the OIS using the OIS correction ratio received from the camera MPU 102 in the same manner as the step S110 in the first embodiment.

Next, in the step S310, the camera MPU 102 starts imaging (exposure). Thereby, the cooperative image stabilization is performed by the IIS and OIS or both of the image sensor 104 and the correction lens 113 during imaging.

This embodiment sets the OIS correction ratio and the IIS correction ratio during imaging in accordance with the moving direction of the image sensor 104 from the position of the image sensor 104 when the imaging starts. Thereby, the image is stabilized utilizing the movable ranges of the correction lens 113 and the image sensor 104 during imaging without unnaturally changing the angle of view when the imaging starts. In addition, since the camera body 100 that performs the image stabilization prior to imaging sets the OIS correction ratio and the IIS correction ratio, it is unnecessary to communicate the position of the image sensor 104 from the camera body 100 to the interchangeable lens 101 when the imaging starts. Therefore, the traffic increase is restrained.

Each of the above embodiments describe that the interchangeable lens 101 and the camera body 100 have the gyro sensors 110 and 106 respectively and the image is stabilized using the output from their gyroscopic sensors. However, one of the interchangeable lens and the camera body may have the gyro sensor, and both the interchangeable lens and the camera body may stabilize the image using the output from the gyro sensor.

For the image stabilization in a certain directional component, each embodiment moves one of the correction lens 113 and the image sensor 104 and does not move the other prior to imaging, and moves the correction lens 113 and the image sensor 104 during imaging. For the image stabilization in another directional component, the correction lens 113 and image sensor 104 may be moved prior to imaging. For example, the image sensor 104 may be rotated for the image stabilization in the roll direction while it is restricted from moving in the pitch direction or yaw direction prior to imaging.

In the first embodiment, the lens MPU 109 serving as the setting unit sets the information on the correction ratio such that where the correctable amount of the image sensor 104 on the first direction side of the position when the imaging starts is smaller than the correctible amount of the image sensor 104 on the second direction side opposite to the first direction, the ratio of a correction of the image sensor 104 on the first direction side to the total image stabilization is smaller than that on the second direction side. At this time, the information on the correction ratio is set such that the ratio of the correction of the correction lens 113 to the total image stabilization when the image sensor 104 is located on the first direction side is larger than that when the image sensor 104 is located on the second direction side. The ratio of the correction, as used herein, may be a shift amount or an angle converted value corresponding to the shift amount.

In the second embodiment, the camera MPU 102 serving as setting unit sets the information on the correction ratio in the same manner as that in the first embodiment.

In the third embodiment, the camera MPU 102 serving as the setting unit sets the information on the correction ratio such that where the correctable amount of the correction lens 113 on the first direction side of the position when the imaging starts is smaller than the correctible amount of the correction lens 113 on the second direction side opposite to the first direction, the ratio of the correction of the correction lens 113 on the first direction side to the total image stabilization is smaller than that on the second direction side. At this time, the information on the correction ratio is set such that the ratio of the correction of the image sensor 104 to the total image stabilization when the correction lens 113 is located on the first direction side is larger than that when the correction lens 113 is located on the second direction side.

The above examples describe that one of the first correction unit and the second correction unit is not moved (or is fixed) prior to imaging, but other embodiments of the present invention are not limited to these examples. If one of the first correction unit and the second correction unit is restricted its moving amount, the first correction unit and the second correction unit may be moved prior to imaging. In other words, the correction unit to be mainly moved for the image stabilization prior to imaging may be controlled so that the ratio of the correction of the correction unit to all image stabilization during imaging is smaller than that prior to imaging.

The way of calculating each of the OIS correction ratio and the IIS correction ratio is not limited to the setting method described in the above embodiments. In calculating the information on the correction ratio without using the angle converted value, the correction ratio between the OIS and the IIS may be changed according to the focal length. For example, the ratio of the OIS to the IIS on the telephoto side (super focal length side) may be larger than that on the wide-angle side (short focal length side). Each of these embodiments can suppress a traffic increase between the first and second optical apparatus, and stabilize the image by moving the first correction unit and the second correction unit without unnaturally changing the angle of view.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-046566, filed on Mar. 14, 2018, and 2019-029042, filed on Feb. 21, 2019, which are hereby incorporated by reference herein in their entirety.

What is claimed is:

1. A lens apparatus attachable to and detachable from a camera including a first correction unit movable for an image stabilization, the lens apparatus comprising:
   a second correction unit movable for the image stabilization; and
   a setting unit,
   wherein, in a state where the lens apparatus is attached to the camera:
      before being instructed to start imaging for recording, one correction unit, among the first correction unit and the second correction unit, moves while the other correction unit thereof does not move during the image stabilization; and
      after being instructed to start the imaging for recording the first correction unit and the second correction unit move during the image stabilization, and
   wherein, after being instructed to start the imaging for recording, the setting unit sets information on a correction ratio between the first correction unit and the second correction unit for each direction of the one correction unit from a position of the one correction unit.

2. The lens apparatus according to claim 1, wherein, after being instructed to start the imaging for recording, the setting unit sets the information based on:
   a correctable amount for each direction of the one correction unit from a first position as the position of the one correction unit; and
   a correctable amount for each direction of the other correction unit from a second position as a position of the other correction unit.

3. The lens apparatus according to claim 2, wherein when the correctable amount of the one correction unit from the first position for a first direction side is smaller than the correctable amount of the one correction unit from the first position for a second direction side opposite to the first direction side, the setting unit sets the information so that a ratio of a correction amount of the one correction unit to a total image stabilization amount for on the first direction side is smaller than a ratio of a correction amount of the one correction unit to a total image stabilization amount for the second direction side.

4. The lens apparatus according to claim 2, wherein when the correctable amount of the one correction unit from the first position for a first direction side is smaller than the correctable amount of the one correction unit from the first position for a second direction side opposite to the first direction side, the setting unit sets the information so that a ratio of a correction amount of the other correction unit to a total image stabilization amount for the first direction side is larger than a ratio of a correction amount of the other correction unit to a total image stabilization amount for the second direction side.

5. The lens apparatus according to claim 1, wherein:
the image stabilization is performed to reduce an image blur caused by an angle shake, and
the setting unit sets as the information a ratio between an angle converted value of an image stabilization amount of the first correction unit and an angle converted value of an image stabilization amount of the second correction unit.

6. The lens apparatus according to claim 5, wherein:
the one correction unit is the second correction unit and the other correction unit is the first correction unit, and
the setting unit receives from the camera a correctable amount for each direction of the first correction unit from the position of the first correction unit as a value that is not an angle converted value.

7. The lens apparatus according to claim 1, further comprising a transmitting unit configured to transmit the information set by the setting unit to the camera.

8. The lens apparatus according to claim 1, further comprising a control unit configured to control a movement of the second correction unit based on the information set by the setting unit.

9. The lens apparatus according to claim 1, wherein the first correction unit and the second correction unit provide an image stabilization in the same direction component during the imaging for recording.

10. A camera to which a lens apparatus including a second correction unit movable for an image stabilization is detachably attached, the camera comprising:
a first correction unit movable for the image stabilization,
a receiving unit; and
a control unit,
wherein, in a state where the lens apparatus is attached to the camera:
before being instructed to start imaging for recording, one correction unit, among the first correction unit and the second correction unit, to move, while the other correction unit thereof to not move during the image stabilization;
after being instructed to start the imaging for recording, the first correction unit and the second correction unit moves during the image stabilization,
after being instructed to start the imaging for recording, the receiving unit receives from the lens apparatus information on a correction ratio between the first correction unit and the second correction unit set for each direction of the one correction unit from a position of the one correction unit, and
wherein the control unit controls a movement of the first correction unit based on the information received by the receiving unit.

11. A control method for a lens apparatus attachable to and detachable from a camera, wherein in a state where the lens apparatus is attached to the camera, before being instructed to start imaging for recording, one correction unit, among a first correction unit movable for an image stabilization and included in the camera and a second correction unit movable for an image stabilization and included in the lens apparatus, moves while the other correction unit thereof does not move during the image stabilization, and after being instructed to start the imaging for recording, the first correction unit and the second correction unit move during the image stabilization, the control method comprising the steps of, in the state where the lens apparatus is attached to the camera:
after being instructed to start the imaging for recording, acquiring information of a correction ratio between the first correction unit and the second correction unit for each direction of the one correction unit from the position of the one correction unit; and
controlling a movement of the second correction unit during the imaging for recording based on the information acquired in the acquiring step.

12. A control method for a camera to which a lens apparatus is detachably attached, wherein in a state where the lens apparatus is attached to the camera, before being instructed to start imaging for recording, one correction unit, among a first correction unit movable for an image stabilization and included in the camera and a second correction unit movable for an image stabilization and included in lens apparatus, moves while the other correction unit thereof does not move during the image stabilization, and after being instructed to start the imaging for recording, the first correction unit and the second correction unit move during the image stabilization, the control method comprising the steps of, in the state where the lens apparatus is attached to the camera:
after being instructed to start the imaging for recording, acquiring information of a correction ratio between the first correction unit and the second correction unit for each direction of the one correction unit from the position of the one correction unit; and
controlling a movement of the first correction unit during the imaging for recording based on the information acquired in the acquiring step.

* * * * *